(12) United States Patent
Kim et al.

(10) Patent No.: US 10,994,584 B2
(45) Date of Patent: May 4, 2021

(54) CENTRALIZED ENERGY MODULE FOR VEHICLE

(71) Applicants: Hyundai Motor Company, Seoul (KR); KIA Motors Corporation, Seoul (KR)

(72) Inventors: Jae Yeon Kim, Hwaseong-si (KR); Yeon Ho Kim, Seoul (KR); Wan Je Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 93 days.

(21) Appl. No.: 16/210,257

(22) Filed: Dec. 5, 2018

(65) Prior Publication Data

US 2020/0086711 A1 Mar. 19, 2020

(30) Foreign Application Priority Data

Sep. 17, 2018 (KR) .................. 10-2018-0110971

(51) Int. Cl.
*B60H 1/00* (2006.01)
*F25B 25/00* (2006.01)
(Continued)

(52) U.S. Cl.
CPC ..... *B60H 1/00342* (2013.01); *B60H 1/00899* (2013.01); *B60H 2001/00928* (2013.01);
(Continued)

(58) Field of Classification Search
CPC .............. B60H 1/32284; B60H 1/3229; B60H 1/00342; B60H 1/3226; B60H 1/00514; B60H 2001/006
See application file for complete search history.

(56) References Cited

U.S. PATENT DOCUMENTS 6,170,270 B1 1/2001 Arshansky et al.
8,215,432 B2 7/2012 Nemesh et al.
(Continued)

FOREIGN PATENT DOCUMENTS

| CN | 103380339 A | 10/2013 | |
|---|---|---|---|
| JP | 5336033 B2 | 11/2013 | |
| WO | WO2009/068547 | * 6/2009 | ............. F25D 9/005 |

OTHER PUBLICATIONS

English translation of WO 2009/068547 (Year: 2020).*

*Primary Examiner* — Cassey D Bauer
(74) *Attorney, Agent, or Firm* — Brinks Gilson & Lione

(57) ABSTRACT

A centralized energy module for a vehicle includes a base plate, a compressor mounted on the base plate, a first condenser mounted on the base plate at a location spaced part from the compressor and configured for condensing the refrigerant through heat-exchange with a first coolant supplied from a high temperature radiator while firstly passing the refrigerant supplied from the compressor, a second condenser connected with the first condenser and configured for condensing the refrigerant through heat-exchange with a second coolant supplied from a low temperature radiator while secondly passing the refrigerant supplied from the compressor, an expansion valve connected with the second condenser, and an evaporator mounted on the base plate, evaporating the refrigerant supplied from the expansion valve through heat-exchange with a third coolant which flows into the evaporator and supplying the evaporated refrigerant to the compressor.

15 Claims, 10 Drawing Sheets

(51) Int. Cl.
   *F28D 9/00* (2006.01)
   *F25B 39/04* (2006.01)
   *F25B 39/02* (2006.01)
   *F28D 21/00* (2006.01)

(52) U.S. Cl.
   CPC ............ *F25B 25/005* (2013.01); *F25B 39/02* (2013.01); *F25B 39/04* (2013.01); *F28D 9/005* (2013.01); *F28D 2021/0084* (2013.01); *F28D 2021/0085* (2013.01)

(56) References Cited

U.S. PATENT DOCUMENTS

| | | |
|---|---|---|
| 8,899,062 B2 | 12/2014 | Prasad et al. |
| 9,109,840 B2 | 8/2015 | Kadle et al. |
| 9,239,193 B2 | 1/2016 | Kadle et al. |
| 2005/0022983 A1 | 2/2005 | Kadle et al. |
| 2006/0067838 A1* | 3/2006 | Grimm ............. B60H 1/00507 417/363 |
| 2010/0154445 A1* | 6/2010 | Sullivan ................ F41H 7/03 62/115 |
| 2012/0222846 A1* | 9/2012 | Kadle ..................... F25B 39/04 165/166 |
| 2013/0283838 A1 | 10/2013 | Kadle et al. |
| 2016/0082805 A1* | 3/2016 | Graaf .................. B60H 1/3213 165/202 |
| 2016/0101666 A1* | 4/2016 | Sugimura .......... B60H 1/32284 165/202 |

* cited by examiner

CENTRALIZED ENERGY MODULE FOR VEHICLE

CROSS-REFERENCE TO RELATED APPLICATION

This application claims priority to and the benefit of Korean Patent Application No. 10-2018-0110971, filed on Sep. 17, 2018, which is incorporated herein by reference in its entirety.

FIELD

The present disclosure relates to a centralized energy (CE) module, which controls a temperature of an interior of a vehicle.

BACKGROUND

The statements in this section merely provide background information related to the present disclosure and may not constitute prior art.

In general, a motor vehicle includes an air conditioning system configured for circulating a refrigerant to heat or cool an interior of the motor vehicle. The air conditioning system which maintains a comfortable interior environment by keeping a temperature of the interior of the vehicle at an appropriate range, regardless of an external temperature change, is configured to heat or cool the interior of the motor vehicle by thermal energy-exchange while the refrigerant discharged by a compressor passes through a condenser, a receiver drier, an expansion valve and an evaporator, and then circulates to the compressor again.

In the air conditioning system, high-temperature and high-pressure vapor refrigerant compressed by the compressor is condensed through the condenser and thereafter, evaporated in the evaporator through the receiver drier and the expansion valve to lower a temperature and humidity of the interior of the vehicle in a summer cooling mode.

In recent years, we have discovered that as interest in energy efficiency and environmental pollution has been increasing, there has been a demand for the development of environmentally friendly vehicles instead of internal combustion engine vehicles. The environmentally friendly vehicles, for examples, are usually electric vehicles driven by fuel cells or hybrid vehicles driven by an engine and a battery.

Among the environmentally friendly vehicles, the electric vehicle and the hybrid vehicle do not use a separate heater used generally in an air conditioning system of the internal combustion vehicle. Instead, the air conditioning system used in the environmentally friendly vehicle is generally referred as a heat pump system.

In the case of the electric vehicle, chemical reaction energy of oxygen and hydrogen is converted into electrical energy to generate a driving force. In the current process in the electric vehicle, since thermal energy is generated by the chemical reaction in the fuel cell, it is desired to remove effectively the generated heat by the fuel cell for securing better performance of the fuel cell.

In addition, even in the hybrid vehicle, a motor is driven by using electricity supplied from the fuel cell, or an electric battery as one of its driving forces with the internal combustion engine. Accordingly, the performance of the motor can be secured only by effectively removing the heat generated from the fuel cell or the battery including the motor.

As a result, in the hybrid vehicle or the electric vehicle, a battery cooling system needs to be separately formed with a separate sealing circuit together with a cooler device and the heat pump system to inhibit excessive heat generated by the motor, electric components, and the battery including the fuel cell. Accordingly, we have discovered that a size and a weight of a cooling module disposed in a front portion of the vehicle increase, and a layout of connection pipes that supply the refrigerant and the coolant to the heat pump system, the cooler, and the battery cooling system is complicated and placed in the limited space in an engine compartment. Furthermore, due to multiple valves for connection with the respective connection pipes and their operations, we have discovered that noise and vibration are transferred to the interior of the vehicle, and it results in degrading a ride comfort.

The above information disclosed in this Background section is only for enhancement of understanding of the background of the present disclosure, and therefore it may contain information that does not form the prior art that is already known to a person of ordinary skill in the art.

SUMMARY

The present disclosure provides a centralized energy (CE) module for a vehicle, which selectively exchanges heat energy generated from refrigerant when the refrigerant is condensed and evaporated, and controls a temperature of an interior of a vehicle by using a low-temperature coolant.

An exemplary form of the present disclosure provides a CE module for a vehicle includes a base plate, a compressor mounted on the base plate and configured for compressing refrigerant, a first condenser mounted on the base plate at a location spaced part from the compressor, and configured for condensing the refrigerant through heat-exchange with a first coolant supplied from a high temperature radiator while firstly passing the refrigerant supplied from the compressor, a second condenser connected with the first condenser, and condensing the refrigerant through heat-exchange with a second coolant supplied from a low temperature radiator while secondly passing the refrigerant supplied from the compressor, an expansion valve connected with the second condenser, and an evaporator mounted on the base plate at a location spaced apart from the first and second condensers, evaporating the refrigerant supplied from the expansion valve through heat-exchange with a third coolant which flows into the evaporator, and supplying the evaporated refrigerant to the compressor.

The first condenser may form multiple first and second paths disposed alternatively to each other therein by stacking first multiple plates, and is configured for exchanging heat of the refrigerant passing through the first paths and the coolant passing through the second paths with each other.

The first condenser is connected with the high temperature radiator through first coolant pipes, so that the coolant is flowed into and discharged from the first condenser.

The second condenser may form multiple third and fourth paths disposed alternatively to each other therein by stacking second multiple plates and is configured for exchanging heat of the refrigerant passing through the third paths and the second coolant passing through the fourth paths with each other.

The first and second condensers may be integrally formed, and the second paths and the fourth paths, through which the coolants flow, may be separated from each other, and the first paths and the third paths, through which the refrigerant flows, may be communicated with each other.

According to a further aspect of the present disclosure, the second condenser may further include a sub-condensing unit having multiple fifth and sixth paths disposed alternatively to each other therein by integrally stacking third multiple plates and being configured for exchanging heat of the refrigerant passing through the fifth paths and the second coolant passing through the sixth paths with each other.

The sub-condensing unit may be disposed on an opposite side of the first condenser with the second condenser interposed therebetween.

According to a further aspect of the present disclosure, the second condenser may be connected with a receiver drier device for vapor-liquid separation of the refrigerant condensed while passing through the second condenser and removing moisture of the refrigerant.

The compressor may be connected with the first condenser through a first refrigerant pipe, the second condenser may be connected with the receiver drier device through a second refrigerant pipe, the sub-condensing unit may be connected with the receiver drier device through a third refrigerant pipe, the expansion valve may be connected with the sub condensing unit through a fourth refrigerant pipe, and the evaporator may be connected with the compressor through a fifth refrigerant pipe.

The second condenser may be connected with the low temperature radiator through second coolant pipes, and the second coolant which flows into the second condenser may first pass through the sub-condensing unit and thereafter, flows into the second condenser.

The refrigerant discharged from the sub-condensing unit may flow into the evaporator through the expansion valve.

The evaporator may form multiple seventh and eighth paths disposed alternatively to each other therein by stacking fourth multiple plates, and be configured for exchanging heat of the refrigerant passing through the seventh paths and the third coolant passing through the eighth paths with each other.

The evaporator may be connected with connection pipes so that the coolant is flowed into and discharged from the evaporator, and the respective connection pipes may be connected with a heating, ventilation and air conditioning (HVAC) module.

The third low-temperature coolant by heat-exchange while passing through the evaporator may be supplied to the HVAC module to cool the interior of the vehicle when a cooling mode of the vehicle is actuated.

The first and second condensers and the evaporator may be formed as a water-cooled heat exchanger in which the first, second and third coolants are circulated.

The refrigerant may be R152-a, R744 or R290 refrigerant.

On the base plate, a cover housing may be mounted so that the compressor, the first and second condensers, the expansion valve, and the evaporator are positioned inside the cover housing. A damper may be mounted between the base plate and the compressor.

According to an exemplary form of the present disclosure, a CE module for a vehicle selectively exchanges heat energy generated from refrigerant when the refrigerant is condensed and evaporated and controls a temperature of an interior of a vehicle by using a low-temperature coolant in a simplified whole system and layout of a connection pipe in which the refrigerant is circulated.

In addition, the present disclosure may improve the condensation performance of the refrigerant, thereby reducing the power consumption of the compressor and improving the cooling performance. The present disclosure can enhance operation efficiency by using a high-performance R152-a, R744, or R290 refrigerant and inhibit noise, vibration, and operation instability as compared with an air conditioning means in the related art.

Furthermore, the manufacturing cost and weight of the vehicle can be reduced through the simplified modularization of the system, and spatial utilization can be enhanced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
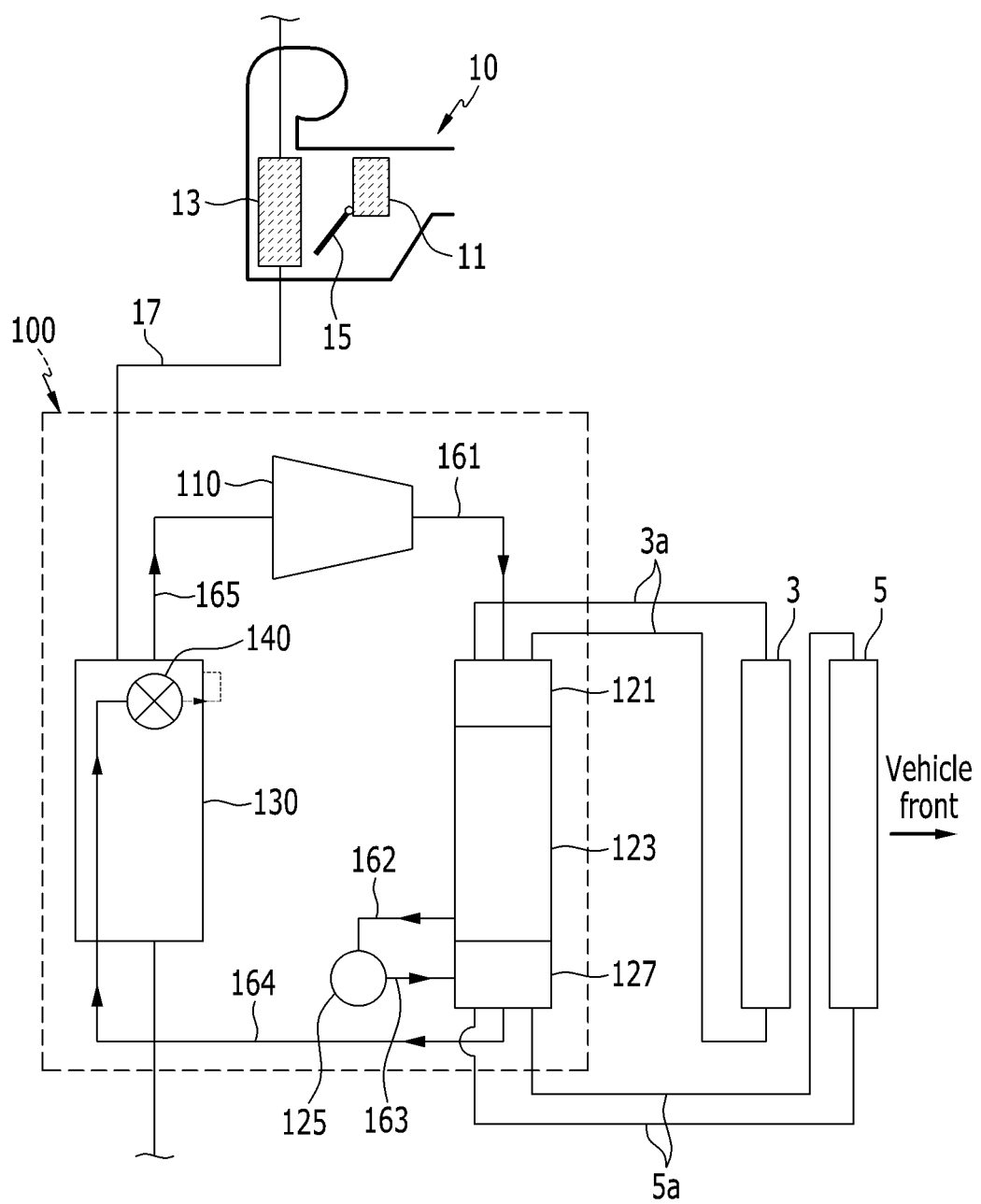
FIG. 1 is a configuration diagram of a CE module for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, throughout the specification, unless explicitly described to the contrary, the word "comprise" and variations such as "comprises" or "comprising", will be understood to imply the inclusion of stated elements but not the exclusion of any other elements.

In addition, the terms "unit", "means", "part", and "member", which are described in the specification, mean a unit of a comprehensive configuration that performs at least one function or operation.

FIG. 1 is a configuration diagram of a centralized energy (CE) module 100 for a vehicle according to an exemplary form of the present disclosure.

The CE module 100 for a vehicle according to the exemplary form of the present disclosure selectively exchanges heat energy generated from refrigerant when the refrigerant is condensed and evaporated with coolant to perform cooling of the vehicle by using only low temperature coolant.

Referring to FIG. 1, the CE module 100 may be connected with a first cooling apparatus which includes a high temperature radiator 3 to cool the vehicle's driving system. In addition, the CE module 100 may be connected with a second cooling device which includes a low temperature radiator 5, which is independent of the first cooling apparatus and a heating, ventilation and air conditioning (HVAC) module 10.

The first cooling apparatus circulates the coolant cooled by the high temperature radiator 3 through actuating a water pump to cool the vehicle's driving system. The second cooling apparatus may circulate the cooled coolant in the low temperature radiator 5 through actuating a water pump to cool a battery module connected with the second cooling apparatus. As shown in FIG. 1, the low temperature radiator 5 may be disposed in front of the high temperature radiator 3 at a front of the vehicle. Thus, the coolant temperature of the high temperature radiator 3 may be higher than the coolant temperature of the low temperature radiator 5.

As shown in FIG. 1, for example, the HVAC module 10 includes an internal heater 11, a cooler 13, and an opening/closing door 15. The cooler 13 are connected with the CE module 100 through a connection pipe 17. In addition, the opening/closing door 15 is provided between the internal heater 11 and the cooler 13. The opening/closing door 15 controls outdoor air passing through the cooler 13 to selectively flow into the internal heater 11 according to cooling, heating, and heating/dehumidifying modes. That is, the opening/closing door 15 is opened so that the outdoor air passing through the cooler 13 flows into the internal heater 11 in the heating mode of the vehicle. On the contrary, the internal heater 11 side of the opening door 15 is closed so that the outdoor air cooled while passing through the cooler 13 immediately flows into the vehicle.

In addition, the centralized energy (CE) module 100 according to the exemplary form of the present disclosure selectively exchanges the heat energy generated when the refrigerant circulated in the CE module 100 is condensed and evaporated with the coolant, and supplies the low-temperature coolant in the HVAC module 10 for exchanging heat. Accordingly, when the cooling mode of the vehicle is actuated, the low-temperature coolant is selectively supplied from the CE module 100 to the cooler in the HVAC module 10. Generally, the refrigerant may be high-performance R152-a, R744, or R290 refrigerant.

Figure 2:
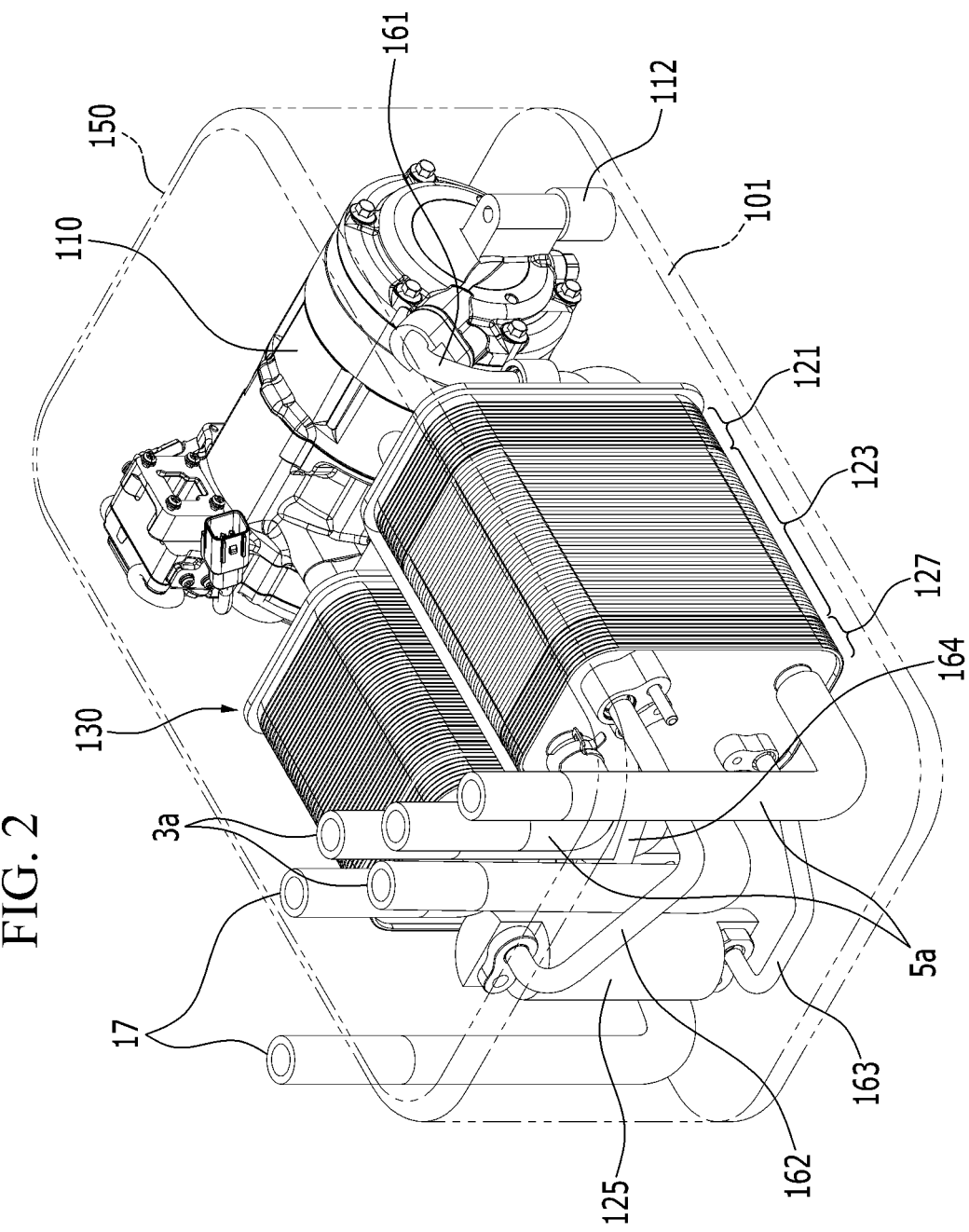
FIG. 2 is a perspective view of the CE module according to the exemplary form of the present disclosure.

In the exemplary form of FIGS. 1 and 2, the CE module 100 includes a base plate 101, a compressor 110, a first condenser 121, a second condenser 123, an evaporator 130, an expansion valve 140, and a cover housing 150. The base plate 101 is formed in a quadrangular plate shape. The compressor 110 is mounted on one surface of the base plate 101, and compresses vapor refrigerant discharged from the evaporator 130.

As shown in FIGS. 1 and 2, the compressor 110 may be connected with the first condenser 121 by a first refrigerant pipe 161. Furthermore, a damper 112 may be mounted between the base plate 101 and the compressor 110. The damper 112 may reduce transfer of vibration and noise generated when the compressor 110 is actuated to the base plate 101. The damper 112 may be made of a rubber material.

The first condenser 121 is mounted on the base plate 101 at a location spaced apart from the compressor 110. The first condenser 121 condenses the refrigerant through heat-exchange with the coolant supplied from the high temperature radiator 3 while firstly passing the refrigerant supplied from the compressor 110. As shown in FIG. 1, the first condenser 121 may be connected with the high temperature radiator 3 through first coolant pipes 3a, respectively so that the coolant is flowed into and is discharged from the first condenser 121.

In the present exemplary form of FIGS. 1 and 2, the second condenser 123 is connected with the first condenser 121. The second condenser 123 condenses the refrigerant through heat-exchange with the coolant supplied from the low temperature radiator 5 while secondly passing the refrigerant supplied from the compressor 110. The second condenser 123 may be connected with the low temperature radiator 5 through second coolant pipes 5a, respectively so that the coolant is flowed into and is discharged from the second condenser 123.

Figure 5:
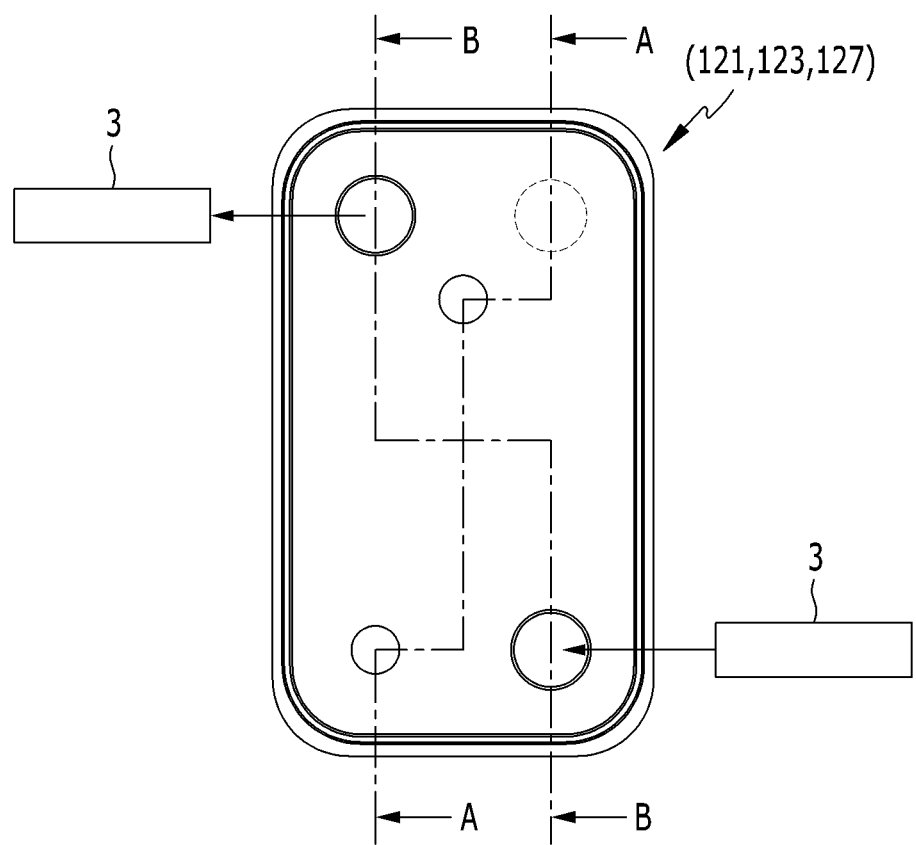
FIG. 5 is a side view of first and second condensers applied to the CE module according to the exemplary form of the present disclosure.
Figure 6:
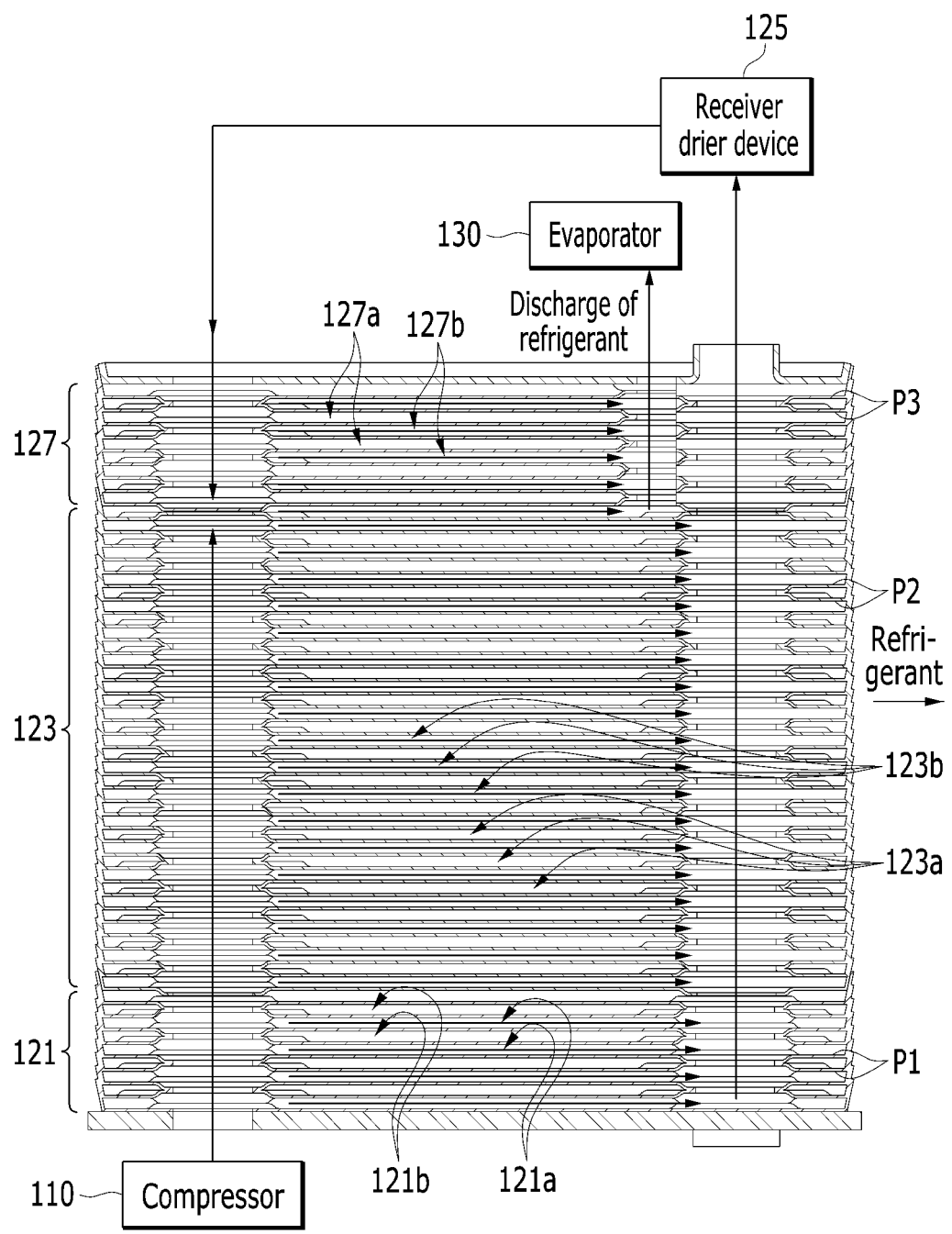
FIG. 6 is an operation state diagram illustrating the flow of coolants in the first and second condensers, and a condensing unit as a cross-sectional view, taken along line A-A of FIG. 5.
Figure 7:
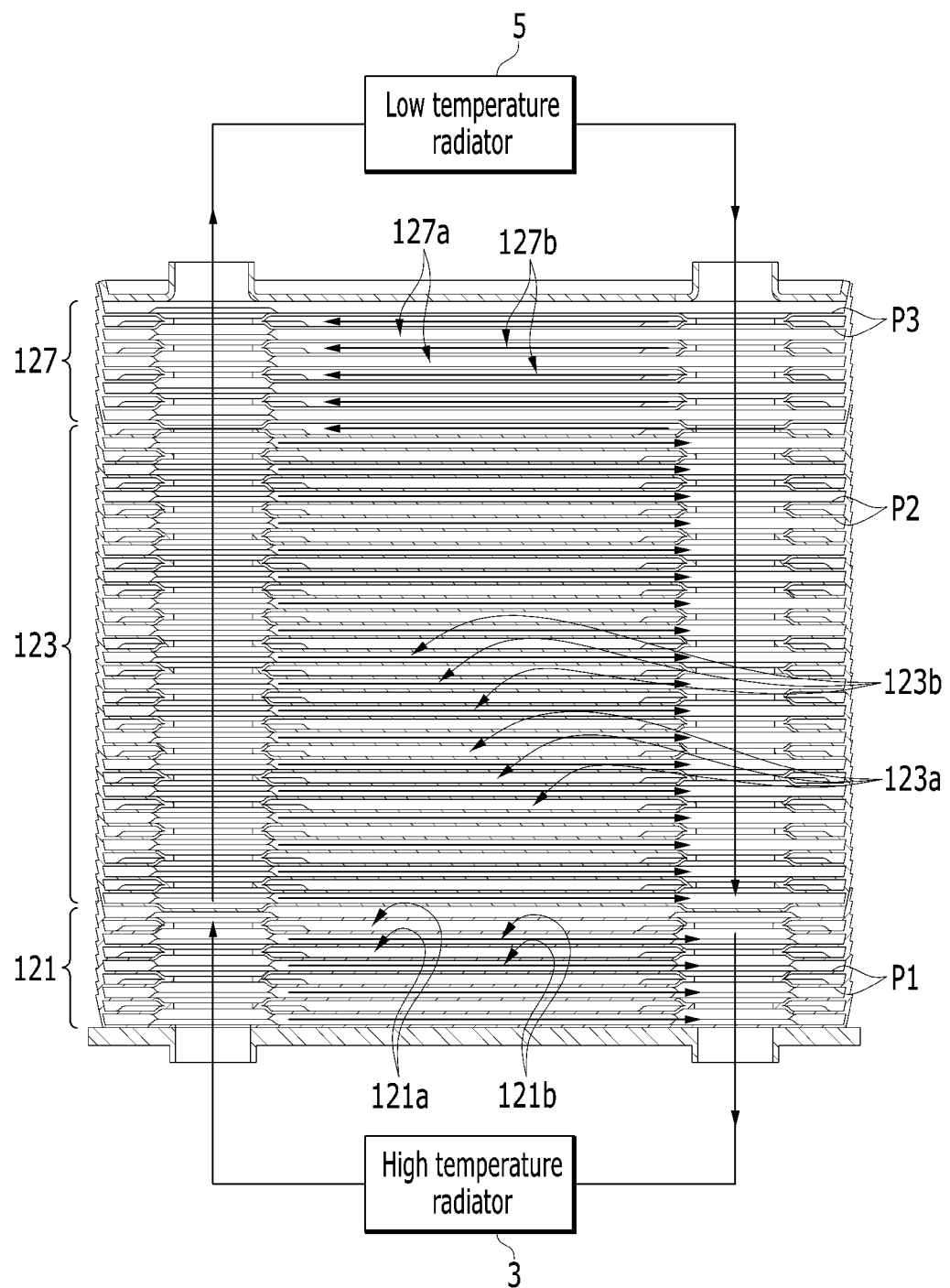
FIG. 7 is an operation state diagram illustrating the flow of a refrigerant in the first and second condensers, and a condensing unit as a cross-sectional view, taken along line B-B of FIG. 5.

Referring to FIGS. 5 to 7, in the first condenser 121, first multiple plates P1 are stacked to form multiple first and second paths 121a and 121b disposed alternatively to each other, respectively. The first condenser 121 is configured to exchange heat of the refrigerant passing through the first paths 121a and the coolant passing through the second paths 121b. In the second condenser 123, second multiple plates P2 are stacked to form multiple third and fourth paths 123a and 123b disposed alternatively to each other, respectively. The second condenser 123 is configured to exchange heat of the refrigerant passing through the third paths 123a and the coolant passing through the fourth paths 123b.

As shown in FIGS. 6 and 7, the first condenser 121 and the second condenser 123 are integrally formed. The first condenser 121 is placed next to the compressor 110, and the second condenser 123 is integrally formed with the first condenser 121 at an opposite side of the compressor 110. In addition, in the first and second condensers 121 and 123, the second paths 121b and the fourth paths 123b, through which the coolant flows, are separated from each other, and the first paths 121a and the third paths 123a, through which the refrigerant flows, may be communicated with each other. Accordingly, a high temperature coolant which flows the second paths 121b is not mixed with a low temperature coolant which flows the fourth paths 123b.

Figure 4:
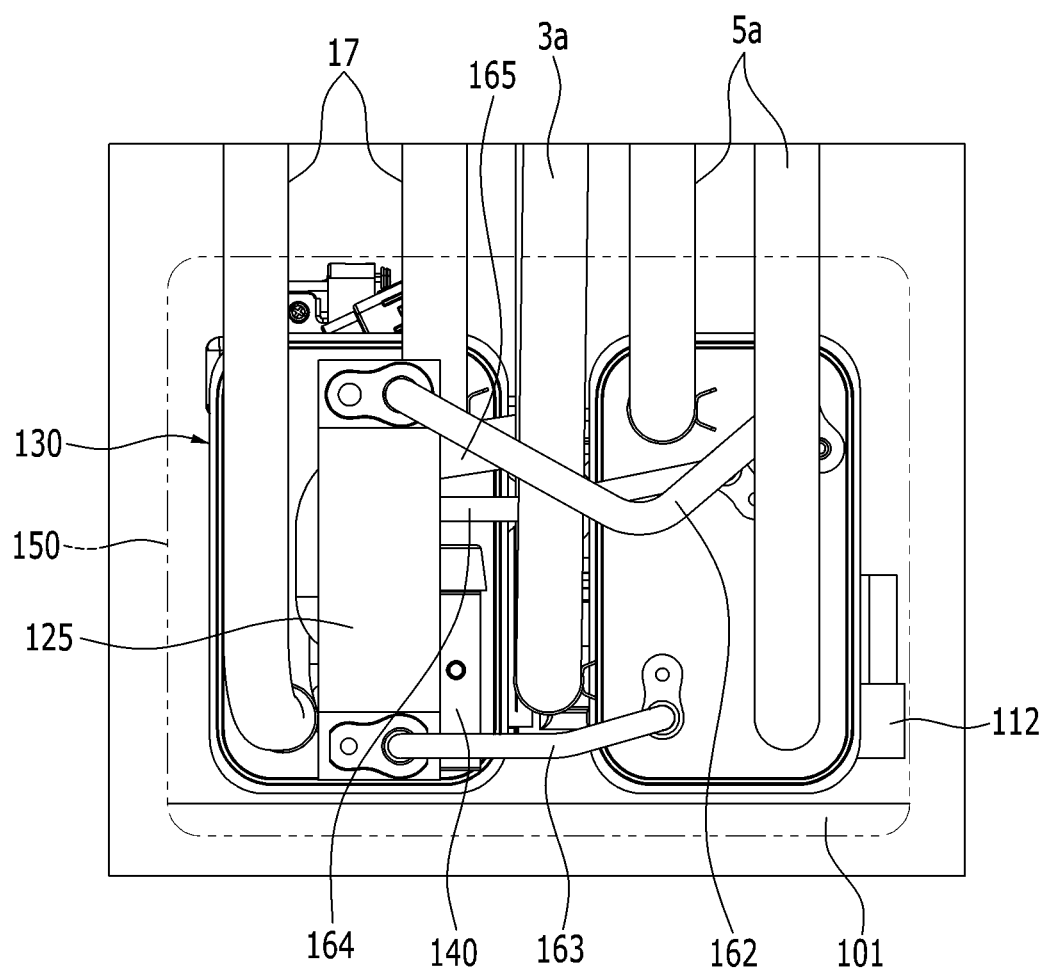
FIG. 4 is a side view of the CE module according to the exemplary form of the present disclosure.

As shown in FIGS. 1, 4 and 5, a first coolant inflow hole and a first coolant discharge hole (not shown) may be formed on one surface of the first condenser 121 facing the compressor 110 each other. The first coolant inflow hole and the first coolant discharge hole are connected with the high temperature radiator 3 through the first coolant pipes 3a. The first coolant inflow hole is connected to the first coolant discharge hole through each of the second paths 121b in the first condenser 121. As a result, the coolant is circulated through the first coolant inflow hole, the second paths 121b, and the first coolant discharge hole.

In addition, a second coolant inflow hole and a second coolant discharge hole (not shown) may be formed on one surface of the second condenser 123 facing the opposite direction of the compressor 110 each other. The second coolant inflow hole and the second coolant discharge hole are connected with the low temperature radiator 5 through the second coolant pipes 5a. The second coolant inflow hole is connected to the second coolant discharge hole through each of the fourth paths 123b in the second condenser 123. As a result, the coolant is circulated through the second coolant inflow hole, the fourth paths 123b, and the second coolant discharge hole.

In FIGS. 2 and 6, the second condenser 123 may be connected with a receiver drier device 125 which is separately provided in the cover housing 150 for vapor-liquid separation of the refrigerant condensed while passing through an inner part of the second condenser 123 and removing moisture of the refrigerant. The receiver drier device 125 is formed in a cylindrical shape and may have a drying agent therein. Further, the receiver drier device 125 may be erected on the base plate 101 along its longitudinal direction.

Referring back to FIGS. 1 through 3, the second condenser 123 may further include a sub-condensing unit 127. The sub-condensing unit 127 is formed integrally with the second condenser 123. The sub-condensing unit 127 is disposed on the opposite side of the first condenser 121 with the second condenser 123 interposed therebetween. In the sub-condensing unit 127, third multiple plates P3 are integrally stacked to form multiple fifth and sixth paths 127a and 127b disposed alternatively to each other. As a result, the sub-condensing unit 127 is configured to exchange heat of the refrigerant supplied from the receiver drier device 125 and passing through the fifth paths 127a and the coolant passes through the sixth paths 127b with each other. When the firstly and secondly condensed refrigerant passing through the first and second condensers 121 and 123 sequentially flows through the receiver drier device 125, the sub-condensing unit 127 may thirdly condense the refrigerant by cooling the refrigerant through heat-exchange with the coolant. Accordingly, the low-temperature coolant, supplied from the low temperature radiator 5 to the second condenser 123, first passes the sixth paths 127b of the sub-condensing unit 127.

As a result, after the refrigerant passing through the second condenser 123 is secondly condensed while passing through the second condenser 123, vapor refrigerant, the moisture, and foreign materials are removed from the refrigerant while the refrigerant passes through the receiver drier device 125. Then, the refrigerant flows into the sub-condensing unit 127 and is additionally cooled together with the low-temperature coolant which flows into the sub-condensing unit 127 earlier to enhance cooling efficiency, thereby increasing its condensing rate.

Figure 3:
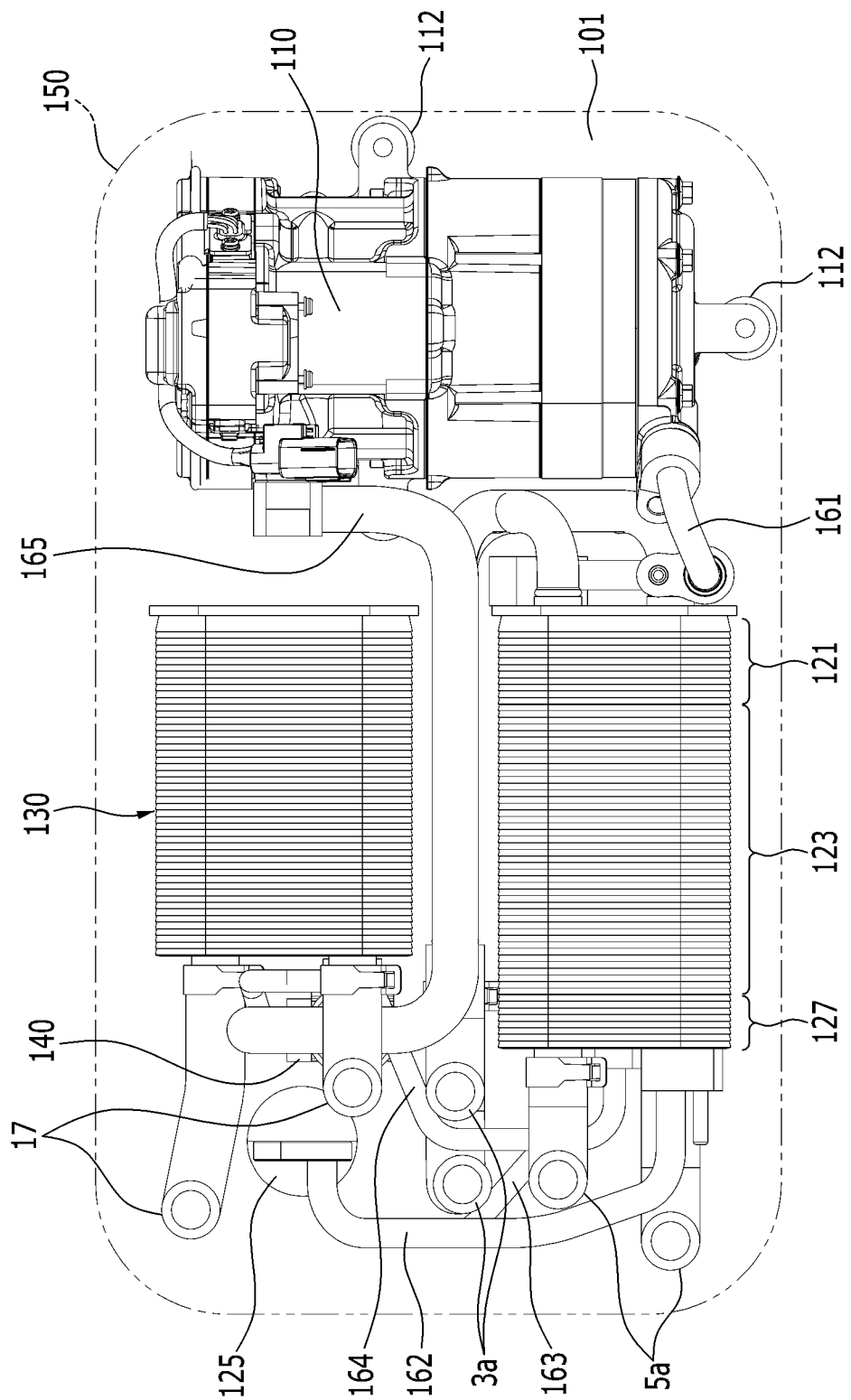
FIG. 3 is a plan view of the CE module according to the exemplary form of the present disclosure.

In an exemplary form of FIGS. 1 through 3, the sub-condensing unit 127 is integrally formed in the second condenser 123, but the present disclosure is not limited thereto and the sub-condensing unit 127 may not be integrally formed in the second condenser 123 as desired.

As shown in FIGS. 1 through 4, the second condenser 123 is connected with the receiver drier device 125 through a second refrigerant pipe 162. The sub-condensing unit 127 is connected with the receiver drier device 125 through a third refrigerant pipe 163. The first and second condensers 121 and 123 and the sub-condensing unit 127 are configured to exchange heat of the flow-in refrigerant with the coolant to condense the refrigerant and supply the heat energy generated when the refrigerant is condensed to the coolant to increase the temperature of the coolant. The increased coolant temperature may be cooled again through the high temperature radiator 3 and the low temperature radiator 5.

The first and second condensers 121 and 123 are configured to form as a water-cooled heat exchanger in which the coolant is circulated. The refrigerant supplied from the compressor 110 is condensed through heat-exchange with the coolant while sequentially passing through the first and second condensers 121 and 123. Then, the vapor refrigerant, the moisture, and the foreign materials are removed from the refrigerant while the refrigerant passes through the receiver drier device 125 through the second and third refrigerant pipes 162 and 163. Then, the refrigerant passing through the receiver drier device 125 may be additionally condensed while passing through the sub-condensing unit 127.

The CE module 100 may further include an accumulator instead of the receiver drier device 125. When the receiver drier device 125 is not provided in the first and second condensers 121 and 123, the accumulator may be provided instead of the receiver drier device 125.

In the exemplary form of FIGS. 1 through 3, the evaporator 130 is mounted on the base plate 101 at a location spaced apart from the first and second condensers 121 and 123. The evaporator 130 evaporates the refrigerant supplied from the expansion valve 140 which is integrally mounted through heat-exchange with the flow-in coolant and supplies the evaporated refrigerant to the compressor 110.

The expansion valve 140 may be connected with the sub-condensing unit 127 integrally formed with the second condenser 123 through a fourth refrigerant pipe 164. As a result, the refrigerant discharged in the sub-condensing unit 127 may flow into the evaporator 130 while being expanded in the expansion valve 140.

Referring to FIG. 2 to FIG. 3, and FIG. 8 to FIG. 10, in the evaporator 130, fourth multiple plates P4 are formed with multiple seventh and eighth paths 132 and 133 disposed alternatively to each other, respectively. The evaporator 130 is configured to exchange heat of the refrigerant passing through the seventh paths 132 and the coolant passing through the eighth paths 133 with each other.

Figure 8:
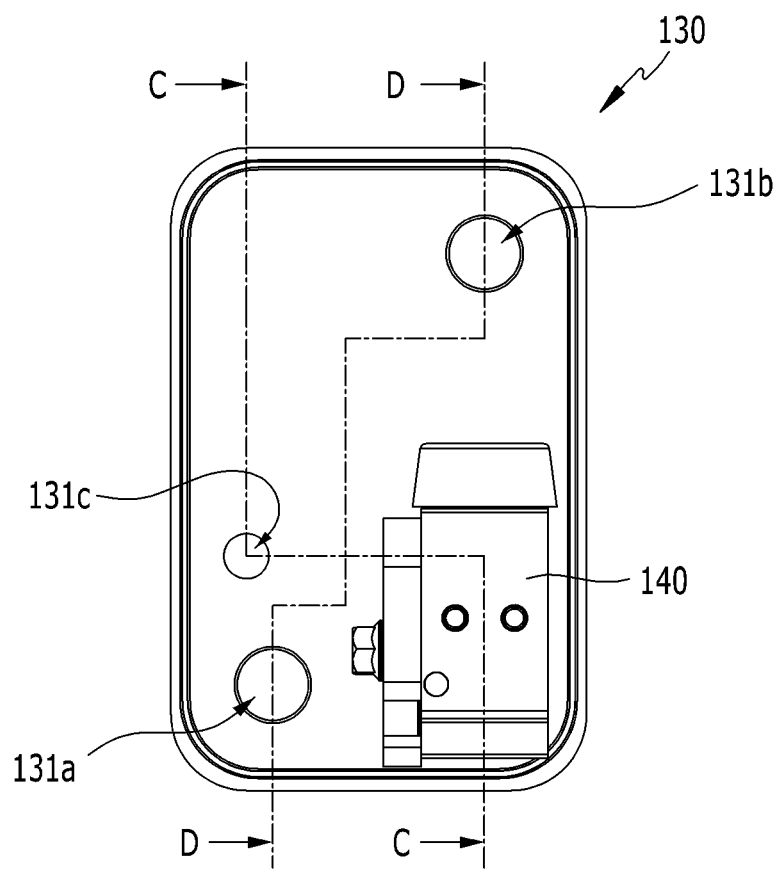
FIG. 8 is a side view of an evaporator applied to the CE module according to the exemplary form of the present disclosure.
Figure 9:
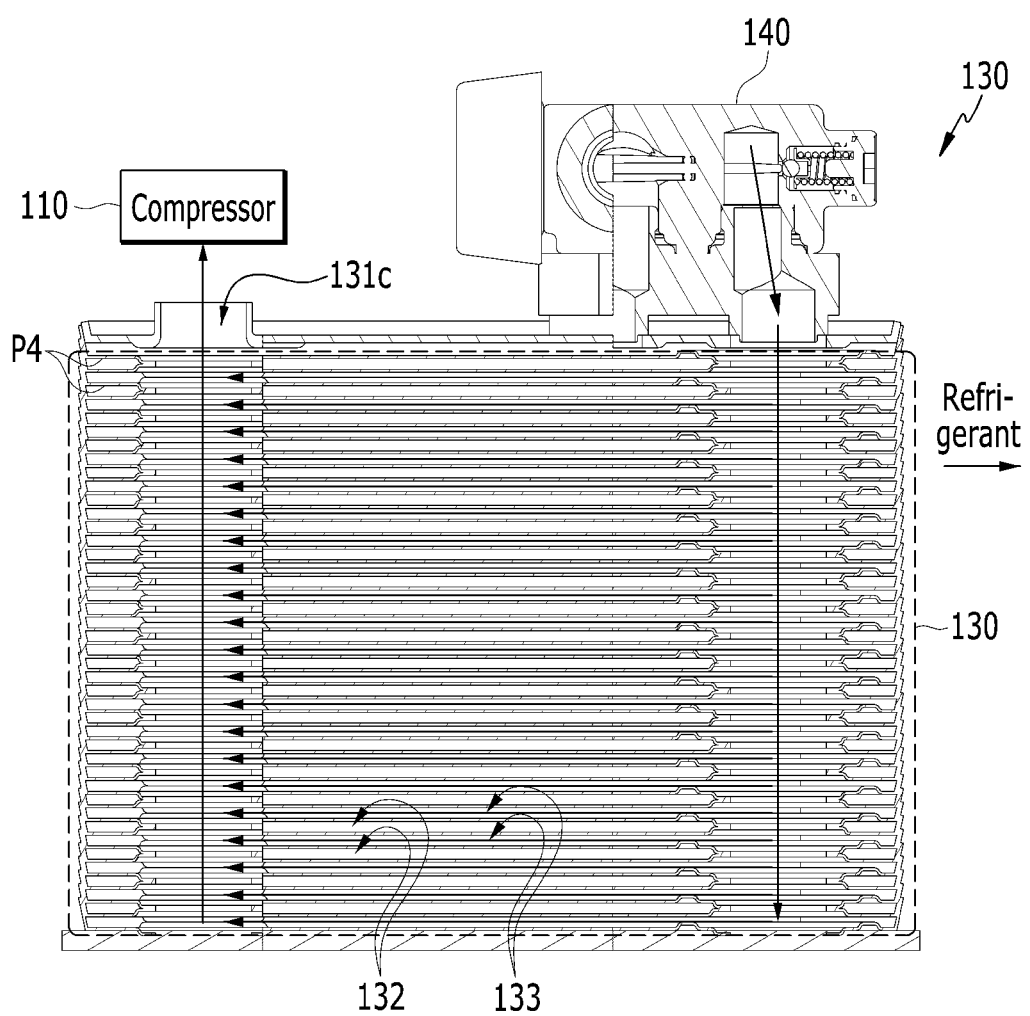
FIG. 9 is an operation state diagram illustrating the flow of the refrigerant in the evaporator as a cross-sectional view, taken along line C-C of FIG. 8.
Figure 10:
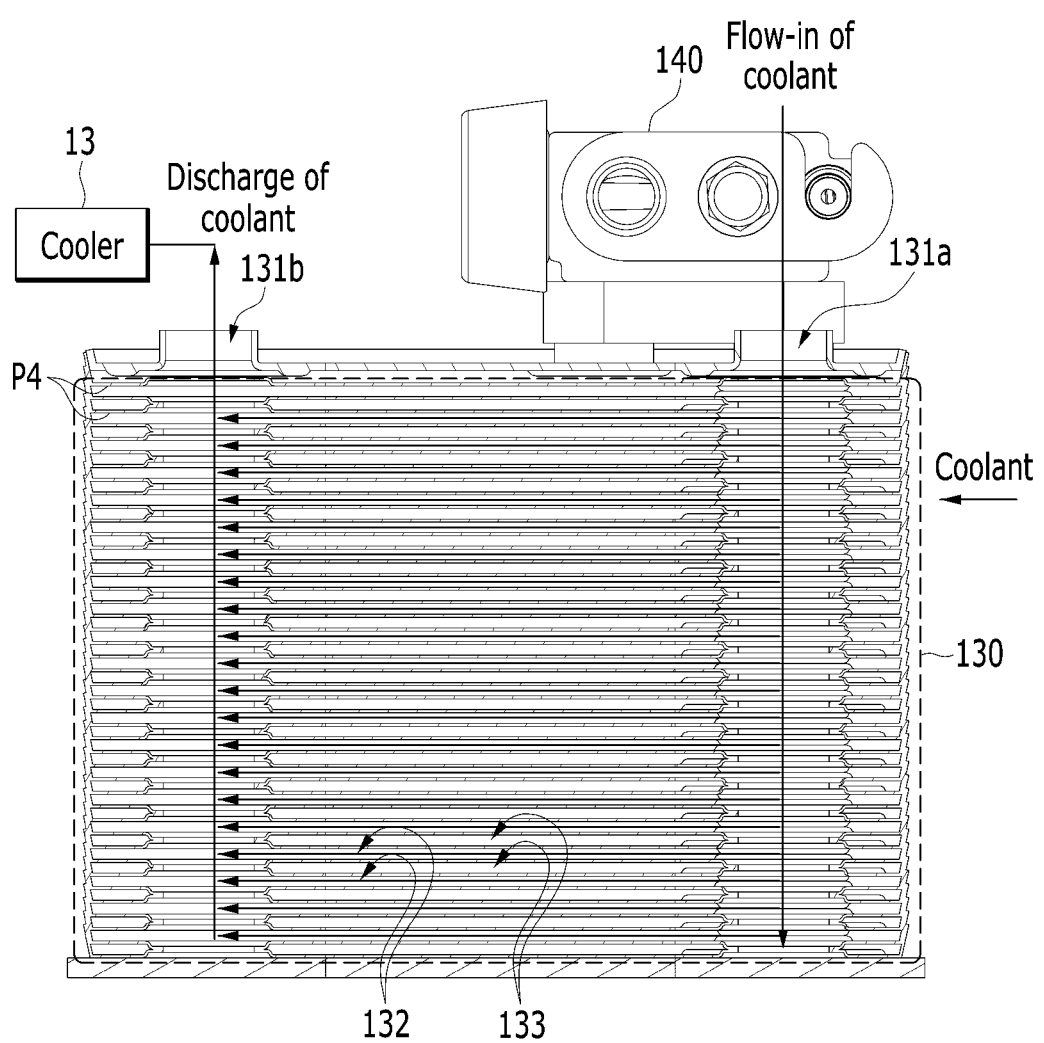
FIG. 10 is an operation state diagram illustrating the flow of the coolant in the evaporator as a cross-sectional view, taken along line D-D of FIG. 8.

According to an example of FIGS. 8 through 10, the expansion valve 140 is directly connected with the evaporator 130, and allows the expanded refrigerant to flow into the seventh paths 132. The expansion valve 140 may be configured as a mechanical type or an electronic type. Furthermore, in the evaporator 130, a third coolant inflow hole 131a and a third coolant discharge hole 131b are formed on both edges opposite to each other on one surface on which the expansion valve 140 is mounted. The third coolant inflow hole 131a and the third coolant discharge hole 131b may be communicated with the eighth paths 133.

As shown in FIGS. 4 and 8, the third coolant inflow hole 131a and the third coolant discharge hole 131b may be formed on each corner portion in a diagonal direction on one surface of the evaporator 130 and the connection pipes 17 may be mounted on the third coolant inflow hole 131a and the third coolant discharge hole 131b, respectively. The third coolant inflow hole 131a is connected with the third coolant discharge hole 131b through each of the eighth paths 133 in the evaporator 130. As a result, the coolant is circulated through the third coolant inflow hole 131a and the third coolant discharge hole 131b.

Furthermore, a refrigerant discharge hole 131c for discharging the refrigerant passing through the seventh paths 132 may be formed in the evaporator 130. A fifth refrigerant pipe 165 connected with the compressor 110 may be mounted on the refrigerant discharge hole 131c.

The evaporator 130 is configured to exchange heat of the refrigerant which supplies from the expansion valve 140 with the coolant to evaporate the refrigerant and supplies the low-temperature heat energy generated when the refrigerant is evaporated to cool the coolant. Accordingly, the low-temperature coolant passed through the evaporator 130 is supplied to the cooler 13 of the HVAC module 10 to cool the interior of the vehicle when the cooling mode of the vehicle is actuated.

As shown in FIGS. 2 and 3, the evaporator 130 may be formed as the water-cooled heat exchanger in which the coolant is circulated. In addition, the cover housing 150 is mounted on the base plate 101 so that the compressor 110, the first and second condensers 121 and 123, the evaporator 130, and the expansion valve 140 are positioned inside the cover housing 150. The cover housing 150 may inhibit the compressor 110, the first and second condensers 121 and 123, the evaporator 130, and the expansion valve 140 mounted on the base plate 101 from being exposed to the outside.

As described above, according to the exemplary form of the present disclosure, when the CE module 100 for a vehicle is applied, the heat energy generated from refrigerant when the refrigerant is condensed and evaporated is selectively exchanged and the temperature of the interior of the vehicle is controlled by using the low-temperature coolant in a simplified whole system and layout of the connection pipe in which the refrigerant is circulated.

The present disclosure may improve the condensation performance of the refrigerant, thereby reducing the power consumption of the compressor 110 and improving the cooling performance. Accordingly, the present disclosure can enhance operation efficiency by using a high-performance R152-a, R744, or R290 refrigerant and inhibit noise, vibration, and operation instability as compared with an air conditioner means in the related art. Furthermore, the manufacturing cost and weight of the vehicle can be reduced through the simplified modularization of the system, and spatial utilization can be enhanced.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

3: High temperature radiator
5: Low temperature radiator
10: HVAC module
11: Internal heater
13: Cooler
15: Opening/closing door
100: CE module
101: Base plate
110: Compressor
112: Damper
121: First condenser
121a: First path
121b: Second path
123: Second condenser
123a: third path
123b: fourth path
125: Receiver drier device
127: Sub condensing unit
127a: fifth path
127b: sixth path
130: Evaporator
132: seventh path
133: eighth path
140: Expansion valve
150: Cover housing
161, 162, 163, 164, 165: first, second, third, fourth and fifth refrigerant pipes

What is claimed is:

1. A centralized energy (CE) module for a vehicle, comprising:
a base plate;
a compressor mounted on the base plate and configured to compress refrigerant;
a first condenser mounted on the base plate at a location spaced part from the compressor, and configured to condense the refrigerant through heat-exchange with a first coolant supplied from a high temperature radiator while firstly passing the refrigerant supplied from the compressor;
a second condenser connected with the first condenser, and configured to condense the refrigerant through heat-exchange with a second coolant supplied from a low temperature radiator while secondly passing the refrigerant supplied from the compressor, wherein a temperature of the first coolant supplied from the high temperature radiator is higher than a temperature of the second coolant supplied from the low temperature radiator;
an expansion valve connected with the second condenser; and
an evaporator mounted on the base plate at a location spaced apart from the first and second condensers, and configured to evaporate the refrigerant supplied from the expansion valve through heat-exchange with a third coolant which flows into the evaporator, and supply the evaporated refrigerant to the compressor,
wherein:
the first condenser forms multiple first and second paths disposed alternatively to each other therein by stacking first multiple plates, and is configured for exchanging heat of the refrigerant passing through the first paths and the coolant passing through the second paths with each other,
the second condenser forms multiple third and fourth paths disposed alternatively to each other therein by stacking second multiple plates, and is configured for exchanging heat of the refrigerant passing through the third paths and the second coolant passing through the fourth paths with each other, and
the second condenser further includes a sub-condensing unit having multiple fifth and sixth paths disposed alternatively to each other therein by integrally stacking third multiple plates and being configured for exchanging heat of the refrigerant passing through the fifth paths and the second coolant passing through the sixth paths with each other.

2. The CE module of claim 1, wherein the first condenser is connected with the high temperature radiator through first coolant pipes, so that the coolant is flowed into and discharged from the first condenser.

3. The CE module of claim 1, wherein the first and second condensers are integrally formed, and the second paths and the fourth paths, through which the coolants flow, are separated from each other, and the first paths and the third paths, through which the refrigerant flows, are communicated with each other.

4. The CE module of claim 1, wherein the sub-condensing unit is disposed on an opposite side of the first condenser with the second condenser interposed therebetween.

5. The CE module of claim 1, wherein the second condenser is connected with a receiver drier device for vapor-liquid separation of the refrigerant condensed while passing through the second condenser and removing moisture of the refrigerant.

6. The CE module of claim 5, wherein:
the compressor is connected with the first condenser through a first refrigerant pipe,
the second condenser is connected with the receiver drier device through a second refrigerant pipe,
the sub-condensing unit is connected with the receiver drier device through a third refrigerant pipe,
the expansion valve is connected with the sub-condensing unit through a fourth refrigerant pipe, and
the evaporator is connected with the compressor through a fifth refrigerant pipe.

7. The CE module of claim 1, wherein the second condenser is connected with the low temperature radiator through second coolant pipes, and the second coolant which flows into the second condenser first passes through the sub-condensing unit and thereafter, flows into the second condenser.

8. The CE module of claim 1, wherein the refrigerant discharged from the sub-condensing unit flows into the evaporator through the expansion valve.

9. The CE module of claim 1, wherein the evaporator forms multiple seventh and eighth paths disposed alternatively to each other therein by stacking fourth multiple plates and is configured for exchanging heat of the refrigerant passing through the seventh paths and the third coolant passing through the eighth paths with each other.

10. The CE module of claim 1, wherein the evaporator is connected with connection pipes so that the third coolant is flowed into and discharged from the evaporator, and the respective connection pipes are connected with a heating, ventilation and air conditioning (HVAC) module.

11. The CE module of claim 10, wherein the third low-temperature coolant by heat-exchange while passing through the evaporator is supplied to the HVAC module to cool an interior of the vehicle when a cooling mode of the vehicle is actuated.

12. The CE module of claim 1, wherein the first and second condensers and the evaporator are formed as a water-cooled heat exchanger in which the first, second and third coolants are circulated.

13. The CE module of claim 1, wherein the refrigerant is R152-a, R744 or R290 refrigerant.

14. The CE module of claim 1, wherein on the base plate, a cover housing is mounted so that the compressor, the first and second condensers, the expansion valve, and the evaporator are positioned inside the cover housing.

15. The CE module of claim 1, wherein a damper is mounted between the base plate and the compressor.

* * * * *